US008336763B2

(12) United States Patent
Grovit

(10) Patent No.: US 8,336,763 B2
(45) Date of Patent: Dec. 25, 2012

(54) SYSTEM AND METHOD FOR PROCESSING TRANSACTIONS

(75) Inventor: Felix Grovit, Brussels (BE)

(73) Assignee: Securen Limited, Kowloon (HK)

(*) Notice: Subject to any disclaimer, the term of this patent is extended or adjusted under 35 U.S.C. 154(b) by 508 days.

(21) Appl. No.: 11/384,223

(22) Filed: Mar. 17, 2006

(65) Prior Publication Data

US 2007/0007330 A1 Jan. 11, 2007

Related U.S. Application Data

(63) Continuation-in-part of application No. 11/178,237, filed on Jul. 8, 2005, now abandoned.

(51) Int. Cl.
*G06F 17/60* (2006.01)

(52) U.S. Cl. .......... 235/379; 235/381; 235/380; 705/39; 705/75

(58) Field of Classification Search ............ 235/379, 235/380; 705/39, 75
See application file for complete search history.

(56) References Cited

U.S. PATENT DOCUMENTS

| | | | |
|---|---|---|---|
| 5,514,491 A | 5/1996 | Webber | |
| 6,338,049 B1 | 1/2002 | Walker et al. | |
| 6,446,052 B1 | 9/2002 | Juels | |
| 2002/0026412 A1 | 2/2002 | Kabin | |
| 2002/0087462 A1 | 7/2002 | Seifert et al. | |
| 2002/0087662 A1 | 7/2002 | Bouet | |
| 2005/0216424 A1* | 9/2005 | Gandre et al. | 705/75 |
| 2005/0269415 A1* | 12/2005 | Licciardello et al. | 235/493 |
| 2007/0045407 A1* | 3/2007 | Paul et al. | 235/380 |
| 2008/0147565 A1* | 6/2008 | Huang et al. | 705/79 |

FOREIGN PATENT DOCUMENTS

| | | |
|---|---|---|
| EP | 0 529 802 A1 | 3/1993 |
| EP | 1156435 A2 | 11/2001 |
| GB | 2 361 571 A | 10/2001 |
| GB | 2360866 A | 10/2001 |
| GB | 2 428 126 B | 1/2007 |
| WO | WO-0167407 A1 | 9/2001 |
| WO | 02/39402 A1 | 5/2002 |
| WO | 2007/029123 A2 | 3/2007 |

OTHER PUBLICATIONS

"United Kingdom Search Report for Application No. GB0513990.2", 1 Page.
International Search Report for counterpart International Application No. PCT/IB2006/003499, 5 pages (Apr. 12, 2007).

(Continued)

*Primary Examiner* — Allyson Trail
(74) *Attorney, Agent, or Firm* — Flaster/Greenberg P.C.

(57) ABSTRACT

There is disclosed a transaction processing server (300), comprising: means (304) for receiving a request (224) to initiate a transaction, the request including user identification data (220) and monetary value authorization data; validating means (302) for validating the monetary value authorization data; processing means (302) for processing the monetary value authorization data to select monetary value data (210) corresponding to the monetary value authorization data; storing means (306) for storing data representing an association between the user identification data (220) and the monetary value data (210); and output means (302) for outputting a monetary value identifier (228) associated with the monetary value data (210). The invention finds particular application in the field of transferring monetary value from a sender to a recipient.

32 Claims, 9 Drawing Sheets

OTHER PUBLICATIONS

UK Examination Report for counterpart UK Application No. GB 0513990.2, 3 pages (May 29, 2008).
Reply to UK Examination Report for counterpart GB 0513990.2, 12 pages (May 29, 2010).
India Patent Office First Examination Report for abandoned counterpart Indian Application No. 1036/CHENP/2007, 2 pages (Jul. 29, 2011).

* cited by examiner

US 8,336,763 B2

SYSTEM AND METHOD FOR PROCESSING TRANSACTIONS

RELATED APPLICATION

This application is a continuation-in-part of U.S. patent application Ser. No. 11/178,237, filed Jul. 8, 2005, now abandoned which application is incorporated herein by reference.

The present invention relates to a transaction processing server, a terminal for facilitating the processing of a transaction, a system for processing transactions, and related methods and apparatus. The invention finds particular application in the field of processing transactions relating to monetary value data.

Computer systems exist which process transactions relating to monetary value data to effect the transfer of monetary value data from a sender to a recipient, for example to provide a money remittance service. In a typical money remittance service, transactions are conducted via registered agents, who enter details of transactions using computer terminals under their control.

FIG. 1 is a schematic of a known monetary remittance system. In the system, there is provided a user terminal 100 associated with a first agent and a recipient terminal 102 associated with a second agent, in the case where the first agent wishes to carry out a monetary value transaction to send an amount of money to the second agent (the recipient). The first agent acts for a sender, and the second agent acts for a recipient. To effect the transfer of money from the sender to the recipient, the first agent inputs data 120 identifying both the sender and the recipient, and inputs payment data 122 in respect of the relevant monetary value delivered to the first agent (by way of a cash payment, for example). A transaction request 124, containing the relevant information to complete the transaction, is then delivered to the second agent, who then delivers the relevant amount of money to the recipient.

This system has several drawbacks. In order to transfer money from the sender to the recipient, the agent must arrange and confirm payment of the relevant amount from the sender, which requires the agents to meet high standards of trust and to have the necessary payment systems in place. The system also requires that all details of the desired transaction are provided when payment is made, which reduces the convenience of the system. These and other factors limit use of the system to agents who have been specially trained to use the system, which in turn limits the geographical coverage and convenience of the system.

In a first aspect, the present invention provides a transaction processing server, comprising: a unit (such as a network interface) for receiving a request to initiate a transaction, the request including user identification data and monetary value authorisation data; a validating unit for validating the monetary value authorisation data; a processing unit for processing the monetary value authorisation data to select monetary value data corresponding to the monetary value authorisation data; a storing unit (such as a hard disk or a database stored within a storage medium) for storing data representing an association between the user identification data and the monetary value data; and an output (such as a network interface under the control of a processor) for outputting a monetary value identifier associated with the monetary value data.

The monetary value authorisation data may be obtained in exchange for a payment made to a third party, for example. The user terminal may be any device such as a workstation, portable computer (such as a PDA or mobile phone) or an Automatic Teller Machine (ATM), for example. By use of the monetary value authorisation data, payment processing systems can be removed from the transaction processing system. This can eliminate the need for agents, for example, in which case the user terminal can be accessed instead be via an internet connection or a telephone call centre, for example.

The transaction processing server may further comprise a unit for receiving a request to execute the transaction, the request including the monetary value identifier; and a unit for processing the monetary value data to execute the transaction. By dividing the transaction into two parts, by first initiating the transaction to associate monetary value data with the user, and then completing the transaction to effect the transfer of the monetary value, greater flexibility is provided. If the user does not wish to specify the recipient of monetary value which has been registered to him, the transaction remains open, and the monetary value remains associated with the user. At a later date, the user can then make the request to complete the transaction, increasing the convenience of the system.

If the server further comprises a transmit unit for transmitting data associated with the transaction to a recipient terminal, the request to execute the transaction may further include recipient identification data and the storing unit may be adapted to store further data representing an association between the recipient and the monetary value data. This can allow a transaction to transfer monetary value from a user terminal to a recipient terminal to be executed without requiring payments (physical or non-physical) to be received and authenticated/validated at the time of execution of the transaction. In turn, this can allow the components of the system which handle the execution of the transaction to be simplified. Once the monetary value data has been transferred, an agent who may be associated with the recipient terminal can place the monetary value at the disposal of a recipient individual (or his successors) for withdrawal or re-forwarding to a further recipient. The recipient terminal may be a workstation, portable computer or an ATM machine, for example.

The processing unit may be adapted to select monetary value data associated with a security code included in the monetary value authorisation data, and the validating unit may be adapted to determine whether or not the security code has previously been used. The security code may be a unique identifier generated in accordance with a cryptographically secure algorithm, for example. This can provide secure access to the monetary value without the use of encryption or authentication systems, thereby making the transaction system simpler and more efficient.

In a related aspect of the invention, there is provided a terminal for facilitating the processing of a transaction, comprising: a receiver for receiving a security code associated with a monetary value; a receiver for receiving user identification data; and a transmitter for transmitting a request to initiate a transaction, the request including user identification data and monetary value authorisation data including the security code; and a receiver for receiving a monetary value identifier associated with the monetary value data. The terminal may further comprise a transmitter for transmitting a request to execute the transaction, the request including the monetary value identifier. The terminal may also further comprise a receiver for receiving recipient identification data, and the transmitter for transmitting a request to execute the transaction being adapted to include the recipient identification data in the request.

The terminal may also comprise a reader (such as a swipe-card reader, smartcard reader or other electronic reader) for reading the security code from a portable data storage device (such as a swipecard, smartcard or other flash memory device, or other permanent or temporary data storage device). The portable data storage device may alternatively be another electronic device (such as a mobile phone or other computing device) able to supply the security code on demand. The terminal may further comprise a memory or store (such as the same or a different swipecard reader, smartcard reader and so on) for storing the monetary value identifier on the portable data storage device. The terminal may also be operable, when transmitting a request to execute the transaction, to include in the request a monetary value identifier as read from the portable data storage device. The invention may also extend to the portable data storage device and the physical and/or electronic configuration thereof to adapt it to interface with a terminal as aforesaid.

In another related aspect of the invention, there is provided a system for processing transactions relating to monetary value data, comprising a terminal as aforesaid, and a transaction processing server also as aforesaid. The system may further comprise a recipient terminal including a receiver for receiving data associated with the transaction, and a processor for executing the transaction in accordance with the received data.

In a further related aspect of the invention, there is provided a method of facilitating the processing of a transaction, comprising: receiving a request to initiate a transaction, the request including user identification data and monetary value authorisation data; validating the monetary value authorisation data; processing the monetary value authorisation data to select monetary value data corresponding to the monetary value authorisation data; storing data representing an association between the user identification data and the monetary value data; and outputting a monetary value identifier associated with the monetary value data.

In a yet further related aspect of the invention, there is provided a method of facilitating the processing of a transaction, comprising: receiving a security code corresponding to a monetary value; receiving user identification data; and transmitting a request to initiate a transaction, the request including the user identification data and monetary value authorisation data including the security code; and receiving a monetary value identifier associated with the monetary value data.

In another aspect of the invention there is provided a method of allocating funds, comprising receiving a request to register a purchased security code corresponding to a monetary value; validating the security code; and, if the security code is valid, allocating the monetary value to the sender of the request.

In a further aspect of the invention there is provided a method of transferring funds from a sender to a recipient, comprising receiving a request from the sender to register a purchased security code corresponding to a monetary value; validating the security code; and, if the security code is valid: allocating the monetary value to the sender; receiving a request from the sender to reallocate at least part of the monetary value to a recipient; and reallocating at least part of the monetary value in accordance with the received request to reallocate.

In this instance, the security code is all that is needed to effect a transfer of funds from a sender to a recipient (although in other aspects the security code may not be required), so more sophisticated payment methods and systems (and, correspondingly, agents to operate them) need not be provided. The security code can be sold to the sender in a number of different forms, including being provided on scratchcards on which the security code can be hidden by a scratchable panel, printing on a receipt generated by a sales till, distributing over the internet via a web page, and so on.

The security code, which may be a simple sequence of digits or other symbols, can then be input into the transaction system more easily than a cash or other transfer of monetary value. A suitably long length of security code may be chosen to limit the effectiveness of 'brute force' cryptographic attacks.

In another aspect of the invention, there is provided a method of transferring funds from a sender to a recipient, comprising allocating to the sender an amount of virtual currency representing money's worth; receiving a request from the sender to reallocate at least part of the virtual currency to a recipient; and reallocating at least part of the virtual currency in accordance with the received request to reallocate.

In a further aspect of the invention, there is provided a computer system for facilitating the transfer of monetary value, comprising: a data memory operable to store monetary value data; an instruction memory storing processor implementable instructions; and a processor operable to read and process the data in accordance with instructions stored in the instruction memory; wherein the instructions stored in the instruction memory comprise instructions for controlling the processor to perform a method as aforesaid.

In a yet further aspect of the invention, there is provided a transaction processing system, comprising: a sender; a recipient; a vendor, for selling a security code corresponding to a monetary value; a transaction processor, for: receiving a request from the sender to register the security code; validating the security code; and, if the security code is valid: allocating the monetary value to the sender; receiving a request from the sender to reallocate at least part of the monetary value to a recipient; and reallocating at least part of the monetary value in accordance with the received request to reallocate; and a recipient agent, for receiving a request from the recipient to redeem at least part of the monetary value, and for transmitting funds to the recipient in response to the request.

The present invention can be implemented in any convenient form, for example using dedicated hardware, or a mixture of dedicated hardware and software. The present invention is particularly suited to implementation as computer software implemented by a workstation or laptop computer. The invention may further comprise a network, which can include any local area network or even wide area, conventional terrestrial or wireless communications network. The systems may comprise any suitably programmable apparatuses such as a general purpose computer, personal digital assistant, mobile telephone (such as a WAP or 3G-compliant phone) and so on. Aspects of the present invention encompass computer software implementable on a programmable device. The computer software can be provided to the programmable device using any conventional carrier medium. The carrier medium can comprise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device. Moreover, various components of the present disclosure are implementable as hardware or software or combinations thereof.

Although each aspect and various features of the present invention have been defined hereinabove independently, it will be appreciated that, where appropriate, each aspect can be used in any combination with any other aspect(s) or features of the invention.

Embodiments of the present invention will now be described with reference to the accompanying drawings, in which.

An embodiment of a transaction processing system will now be described with references to FIGS. 2 to 11.

Figure 1:
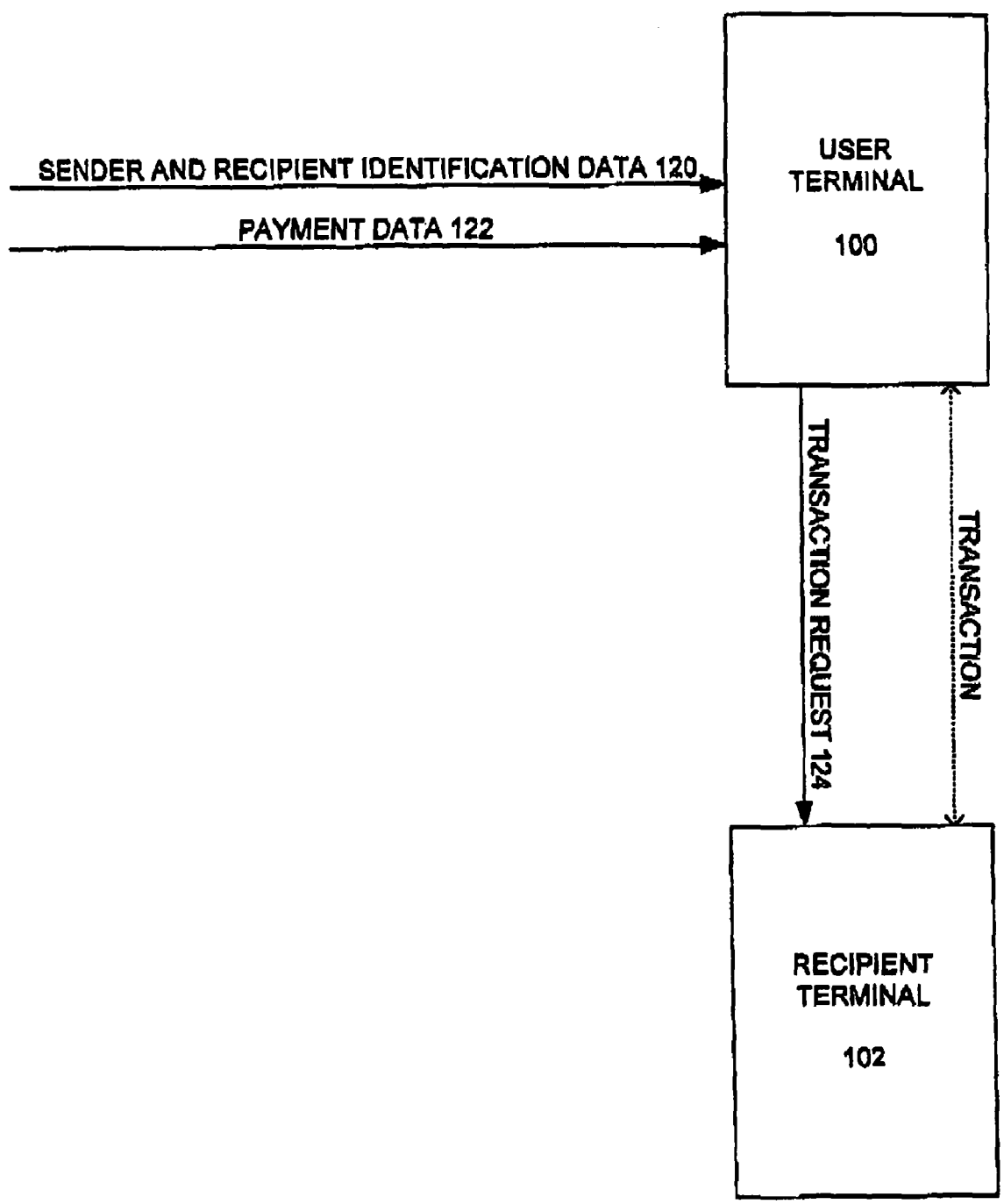
FIG. 1 is a schematic diagram of a prior art transaction system.
Figure 2:
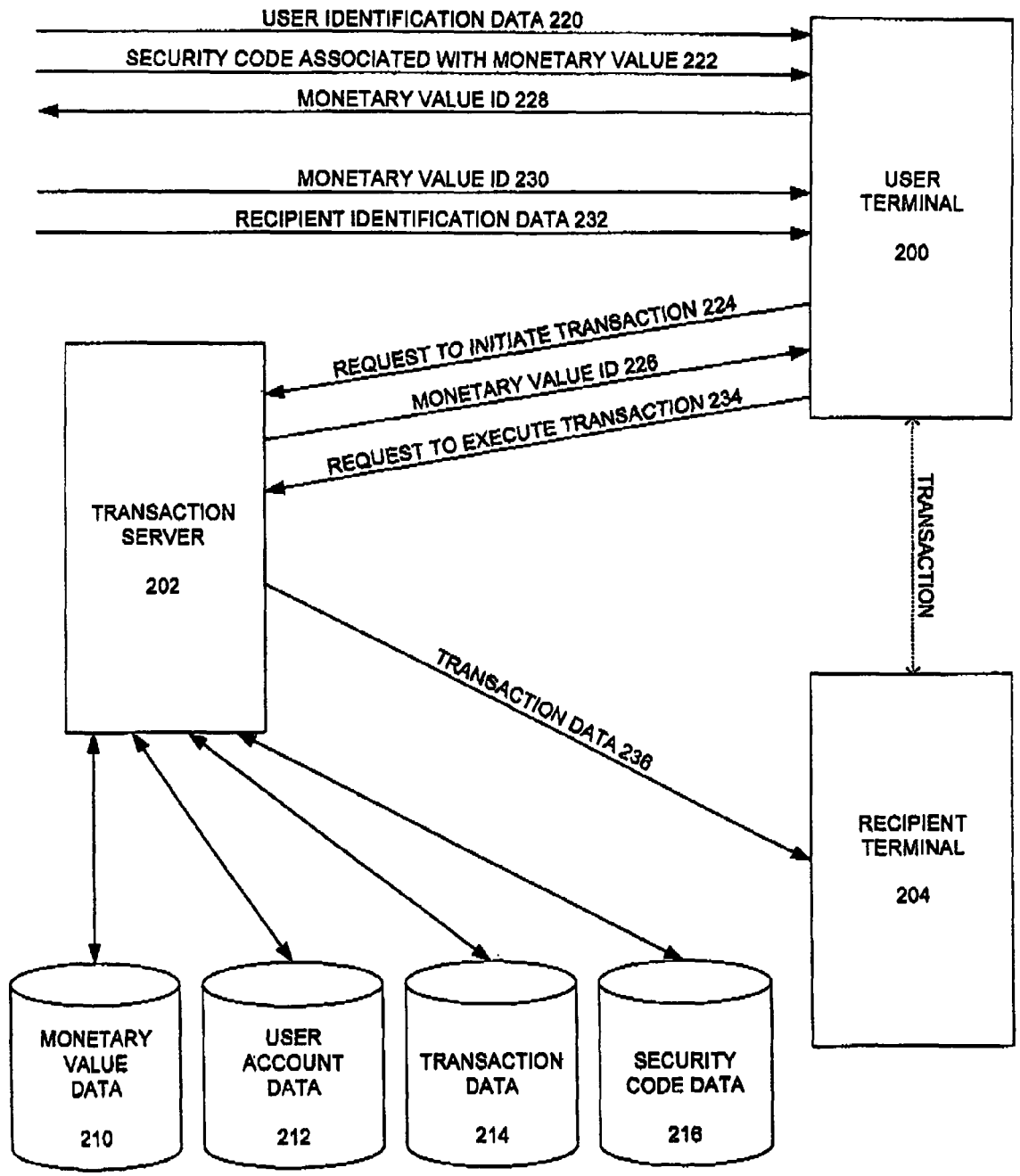
FIG. 2 is a schematic diagram of a transaction processing system in accordance with an embodiment of the present invention.

In FIG. 2, a user terminal 200, transaction server 202 and recipient terminal 204 are connected together over a network, such as the Internet. The transaction server communicates with a monetary value data store 210, user account data store 212, transaction data store 214 and security code store 216. The data stores 210, 212, 214, 216 are provided locally to the transaction server, but may in alternative embodiments be provided at one or more different locations.

In order to assign monetary value to a user, monetary value data is introduced into the system (stored in the monetary data store 210) and associated with a unique security code. The security code is a sequence of digits of the form "1234 5678 9012 3456" which has a unique correspondence to the stored monetary value data. The sequence is chosen to be long enough relative to the total number of stored monetary values that it is secure against cryptographic attack (by 'brute force' methods, for example).

As is explained in more detail later on, various messages are communicated to and from the user terminal 200, transaction server 202 and recipient terminal 204. In a first stage, a transaction involving the monetary value is initiated. In this first stage, the user provides user identification data 220 and the security code 222 associated with the monetary value, and the user terminal transmits a corresponding request 224 to initiate the transaction to the transaction server 202. The server 202 then processes the request and, if it is successful, returns a monetary value ID 226 associated with the monetary data value. The monetary value ID is then outputted to the user as the ID 228.

In a second stage, the transaction is executed. In this stage, the user inputs at the user terminal 200 a monetary value ID 230, matching the previously output ID 228, and recipient identification data 232. The user terminal then transmits to the transaction server 202 the appropriate request 234 to execute a transaction. The server 202 then processes the request, and executes the transaction. In the process, transaction data 236 is transmitted to the recipient terminal 204 to complete the transaction.

The components of the user terminal 200 and transaction server 202 will now be described, with references to FIGS. 3 and 4.

Figure 3:
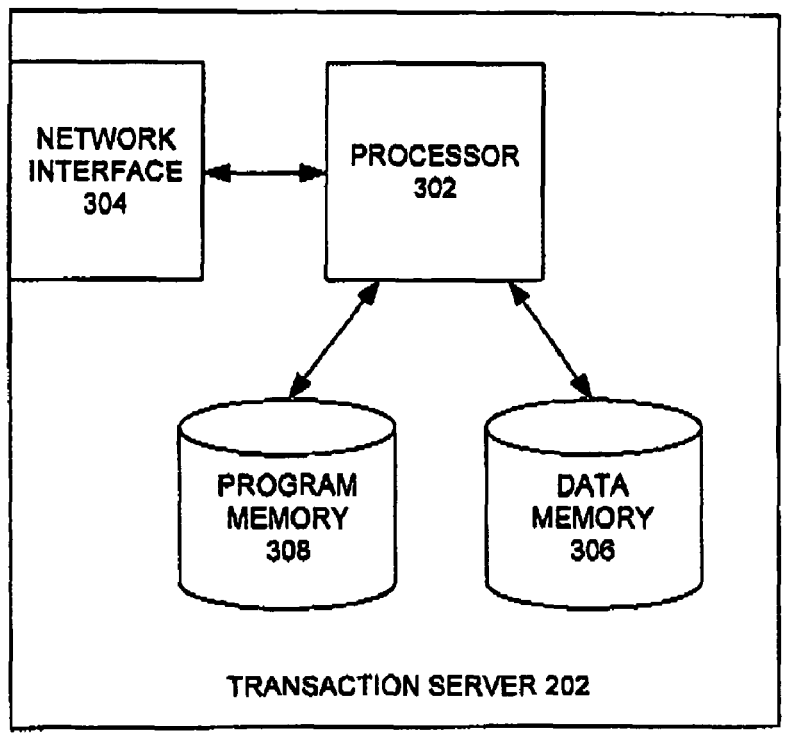
FIG. 3 is a schematic diagram of the components of the transaction server of FIG. 2.

In FIG. 3, the components of the transaction server 202 are shown. The server 202 comprises a processor 302, a network interface 304, a data memory 306 and a program memory 308. The data memory 306 is a mass storage device which includes the data stores 210, 212, 214, 216 shown in FIG. 2. The program memory 308 contains executable code for carrying out the operations of the transaction server as described herein. In variants of the main embodiment, the processor 302 may in fact comprise a plurality of processors, which may be provided within a plurality of computer systems. The network interface 304 may also be divided into a plurality of interfaces suitable for connecting the server 202 to the relevant other devices. The server 202 may further comprise dedicated cryptographic hardware and/or software components. Various components may be included in or removed from the server 202 as appropriate.

Figure 4:
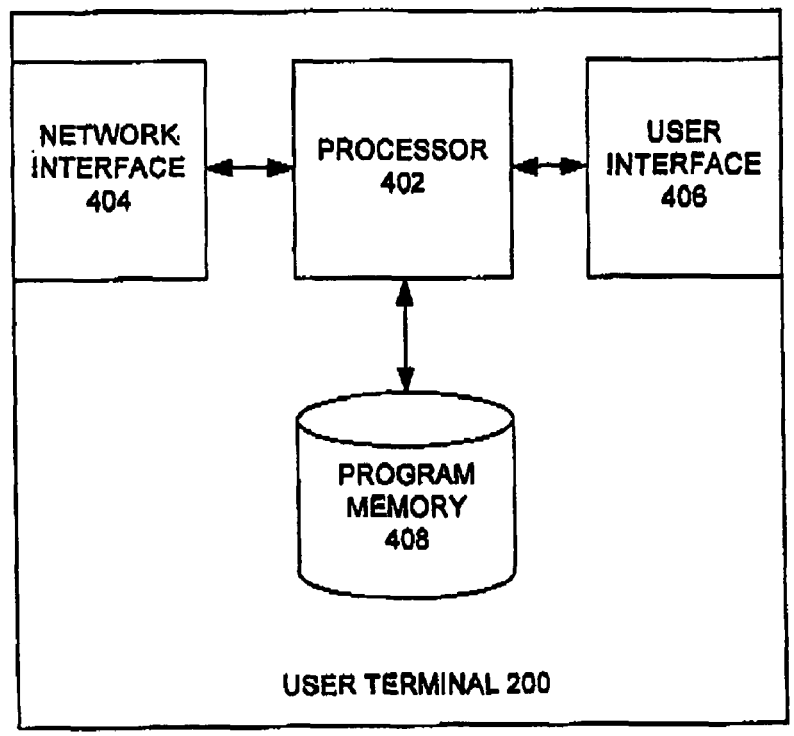
FIG. 4 is a schematic diagram of the components of the user terminal of FIG. 2.

In FIG. 4, the components of the user terminal 200 are shown. The terminal 200 comprises a processor 402, network interface 404, user interface 406 and program memory 408. A data memory (not shown) may additionally be provided. The terminal may be a conventional PC or other computer, or a dedicated hardware module. As before, the program memory 408 contains executable code for carrying out the operations of the terminal as described herein.

Figure 5:
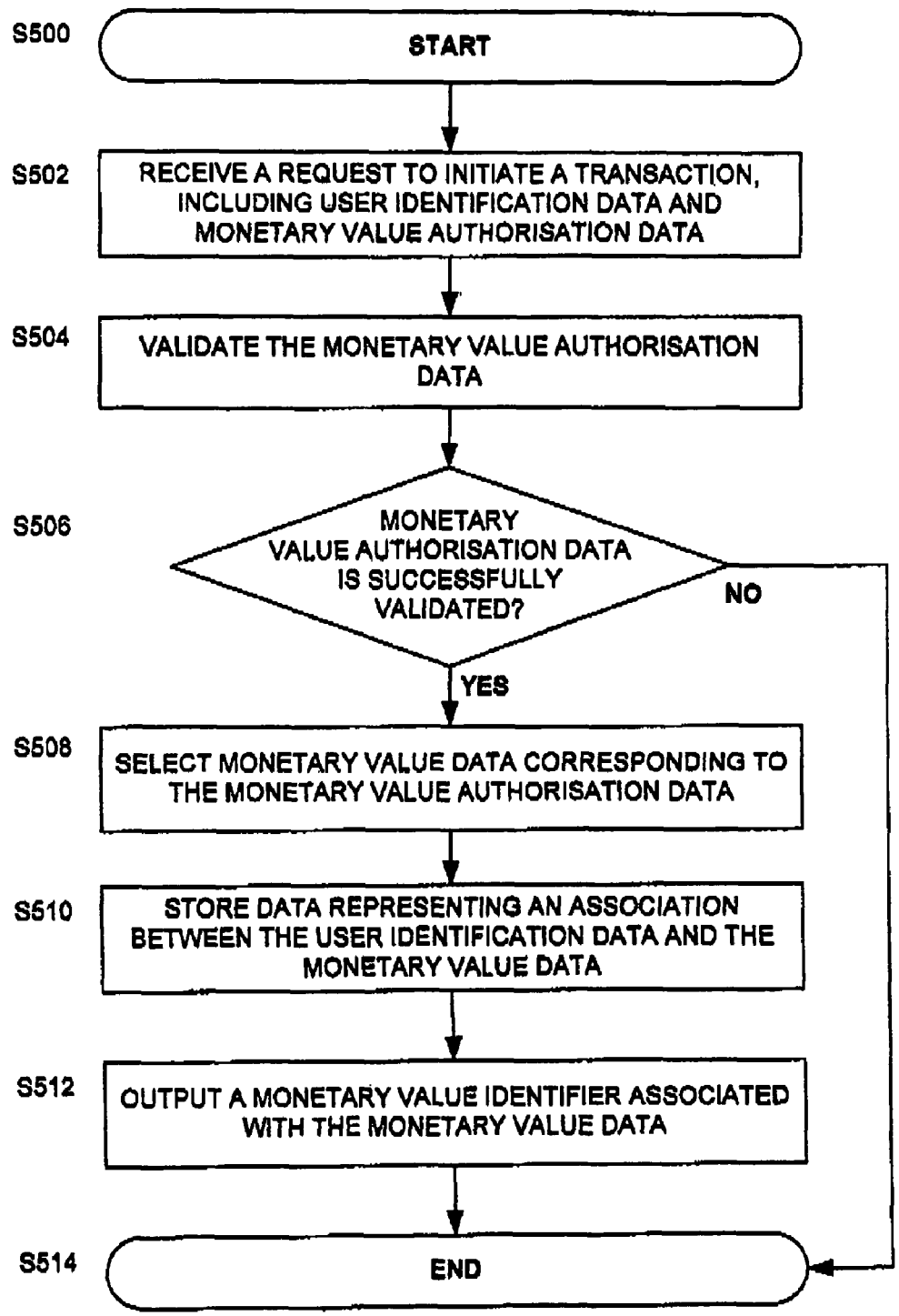
FIG. 5 is a flowchart illustrating the initiation of a transaction in the system shown in FIG. 2.

The operation of the transaction server to initiate a transaction will now be described in more detail with reference to FIG. 5.

The process begins in step S500 once the user has obtained a security code and transmitted the relevant data to a user terminal. In step S502, a request to initiate a transaction is received from the user terminal. The request includes user identification data (relating to the user) and monetary value authorisation data which, as mentioned above, includes the security code (or a representation thereof).

The server validates (step S504) the monetary value authorisation data, by extracting the security code and matching it against a database of security codes stored in the security code data store 216 of FIG. 2. If the validation fails (step S506), because the security code does not exist in the database or because it is does not fulfil other criteria, the request is refused and the transaction is terminated lumps to step S514). The validation criteria may include determining where the relevant security code was purchased (for example in terms of physical location, such as a geographical location such as a shop, or a country of purchase) and ensuring that it corresponds to the location or ownership of the user terminal, or assessing aspects of the user identification data. By storing appropriate data, an audit trail back to the original seller can be provided. The validation step may alternatively comprise inputting the security code into a validation algorithm and, if the code is validated, flagging up that the security code in question has been used (by storing it in a list of used and/or expired codes, for example).

If the validation succeeds, the monetary value data corresponding to the monetary value authorisation data (in particular, relating to the security code) is selected (from the monetary value data store 510 of FIG. 2) in step S508. Data is then stored (in the monetary value data store 510 of FIG. 2) which represents an association between the user identification data and the monetary value data, in step S510. The user account details are updated accordingly (in the user account data store 212 of FIG. 2), and an entry is (optionally) made in the transaction store (item 214 of FIG. 2) to reflect the initiation of an open-ended transaction.

The transaction server then outputs (to the user terminal) in step S512 a monetary value identifier associated with the monetary value data. The identifier may be an index into a database in the monetary value data store relating to the relevant monetary data value, for example, or it may be a cryptographically secure code (similar to the security code associated with the monetary value data). The process of initiating a transaction is then complete (step S514).

Figure 6:
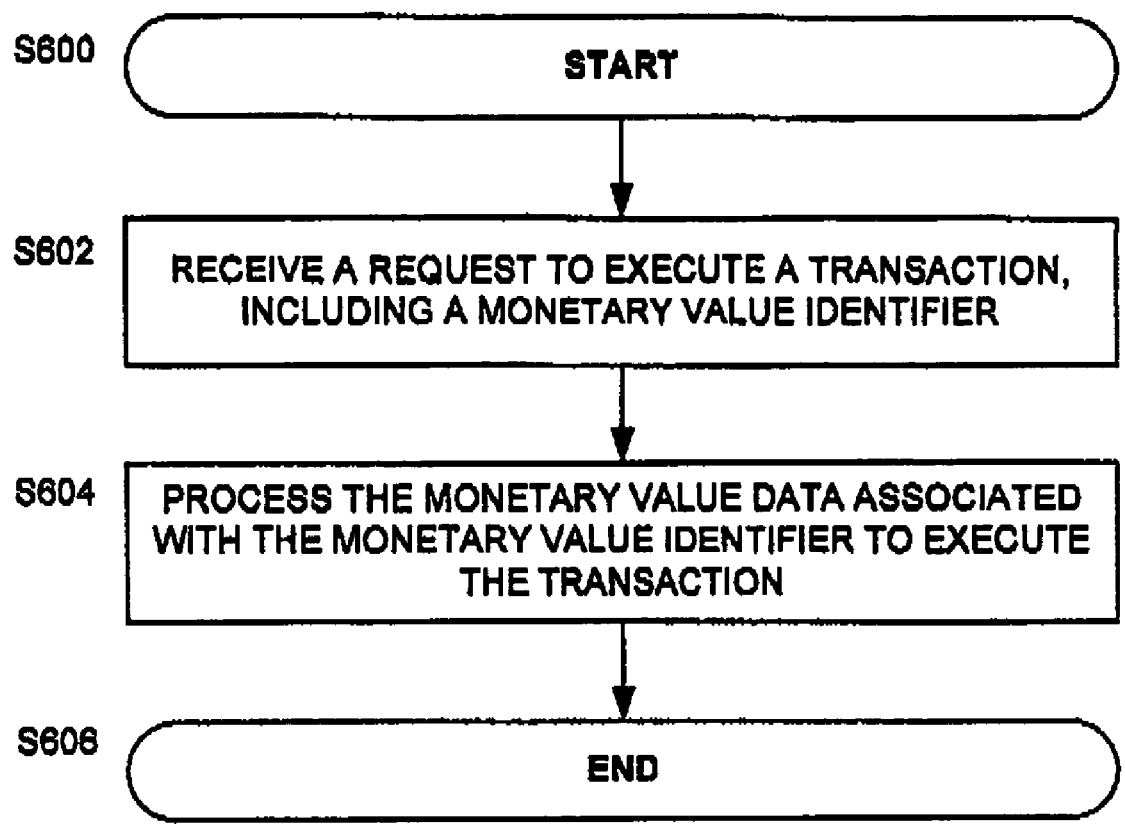
FIG. 6 is a flowchart illustrating the execution of a transaction in the system shown in FIG. 2.

The operation of the transaction server to execute a transaction, after it has been initiated in accordance with the process shown in FIG. 5, will now be described in more detail with reference to FIG. 6.

In step S600, the operation commences, for example after the user has decided how the monetary value (which was previously registered to him) is to be assigned. In step S602, a request to execute the transaction is received from the user terminal. The request includes the monetary value identifier which is transmitted to the user terminal in step S512 of FIG. 5. This identifier allows the two stages of initiating a transaction and executing a transaction to be matched (although in variants of the main embodiment, other identifiers or procedures may be used, such as referring to the user account data associated with the user, for example). Further validation procedures may be used at this point, for example to ensure that the user sending the request to execute the transaction is the same user who sent the request to initiate the transaction. however, since a cryptographically secure monetary value identifier may be used, this validation may not be necessary.

In step S604, the transaction server processes the request, and in turn processes the monetary value data associated with the monetary value identifier so as to effect the execution of the transaction. The monetary value may be transmitted (via the transaction data 236 of FIG. 2) to a recipient terminal 204, for example, or it may be redeemed by the user (in the form of cash or other money's worth), for example. The transaction is then completed (step S606).

When transferred to a recipient, the monetary value may be redeemed (as cash, for example), or it may be held on behalf of the recipient. The recipient may for example repeat the steps of initiating and/or executing transactions involving the monetary value data. In this case, the recipient may be required to provide a new security code (given to him by the user/sender, or transmitted securely via the transaction processing system), which may be used in the same way as the security code mentioned above. Alternatively, the recipient may need to provide some other form of identification, such as providing a transaction identifier which may, for example, be transmitted to the user once the transaction has been executed, for forwarding to the recipient.

It will be appreciated from the above that the monetary value may be transferred between multiple recipients without any modification or transfer of the monetary value data stored in the monetary value data store 210. This can provide an efficient system for transferring monetary value since relatively little information is required to conduct further transactions once the initial transaction and/or insertion of the monetary value into the system has taken place.

The operation of the system from a user's perspective will now be described with reference to FIG. 7. In this variant of the main embodiment, security codes are provided in the form of scratchcards including one revealable number (the security code).

In step S702 the user purchases a scratchcard corresponding to the amount of funds to be transferred. The price of the scratchcard includes a first portion corresponding to the nominal monetary value of the scratchcard (displayed on the scratchcard) and a second portion corresponding to commission received by the seller for the sale of the scratchcard (the seller need not have any formal association, such as acting as an agent, with the transaction processing system). The monetary value of the scratchcards include a nominal currency (such as GB £ or US $) and an amount of that currency. The user may thus, for example, purchase a nominal £100 scratchcard for a price of £105 (of which £5 is retained by the seller).

In step S704 the user scratches the scratchcard to reveal the security code. The user then contacts the transfer service (that is, the transaction processing service), for example by ringing a call centre or accessing a web portal, to register the scratchcard and claim the associated monetary value.

If the user is not yet registered with the transfer service (step S706), he provides sufficient information to allow an account to be opened (step S708). The amount of information required to open an account may vary from territory to territory but may include, for example, name and address details. In a variant of the main embodiment, steps S706 and S708 are omitted, when transactions are permitted to be initiated and executed with minimal or no account details (for reduced flexibility but increased anonymity).

In step S710 the user transmits the security code to the transfer service (by phone, in the case of a call centre, or by filling in a web form, in the case of Internet access, for example). The transfer service then processes the security code using a user terminal and transaction server as described above, and transmits to the user (in step S712) a virtual currency ID relating to the funds (the monetary value) associated with the scratchcard/security code. Also as described above, the relevant funds are by now registered with the user's account (if appropriate). The transaction has now been successfully initiated (step S714).

The execution of a transaction of monetary value will now be described from the user's perspective with reference to FIG. 8.

The process begins in step S800 when the user determines what transaction is to be executed using the monetary value now registered to him.

The user transmits (step S802) the virtual currency ID relating to the funds associated with the relevant scratchcard/security code, via the web interface, call centre number, and so on. The user also provides (step S804) details of the recipient of the relevant funds (the monetary value). Such details may include any or all of a recipient agent, the recipient name, the recipient address, and so on. The user then requests that the transaction be executed (step S806).

The transaction server then executes the transaction as instructed, and returns to the user (step S810) an authorisation code associated with the transaction. At the choice of the transfer service, the recipient may need to present the authorisation code in order to obtain the transferred funds (monetary value), or the code may serve only as a form of transaction identifier, with which the user can access records relating to the transaction, for example. In the former case, the user then transmits the authorisation code to the recipient (step S812). In a variant of the main embodiment, step S810 may be omitted, and/or an additional code word may be provided by the user, which the recipient needs to reproduce in order to complete the transaction.

Once the receiving agent provides the funds to the recipient (step S814), the transaction is completed (step S816). As mentioned elsewhere, step S814 may be varied, in the case where the recipient wishes to retransmit the monetary value to a further recipient, by interaction with the receiving agent or otherwise.

Figure 7:
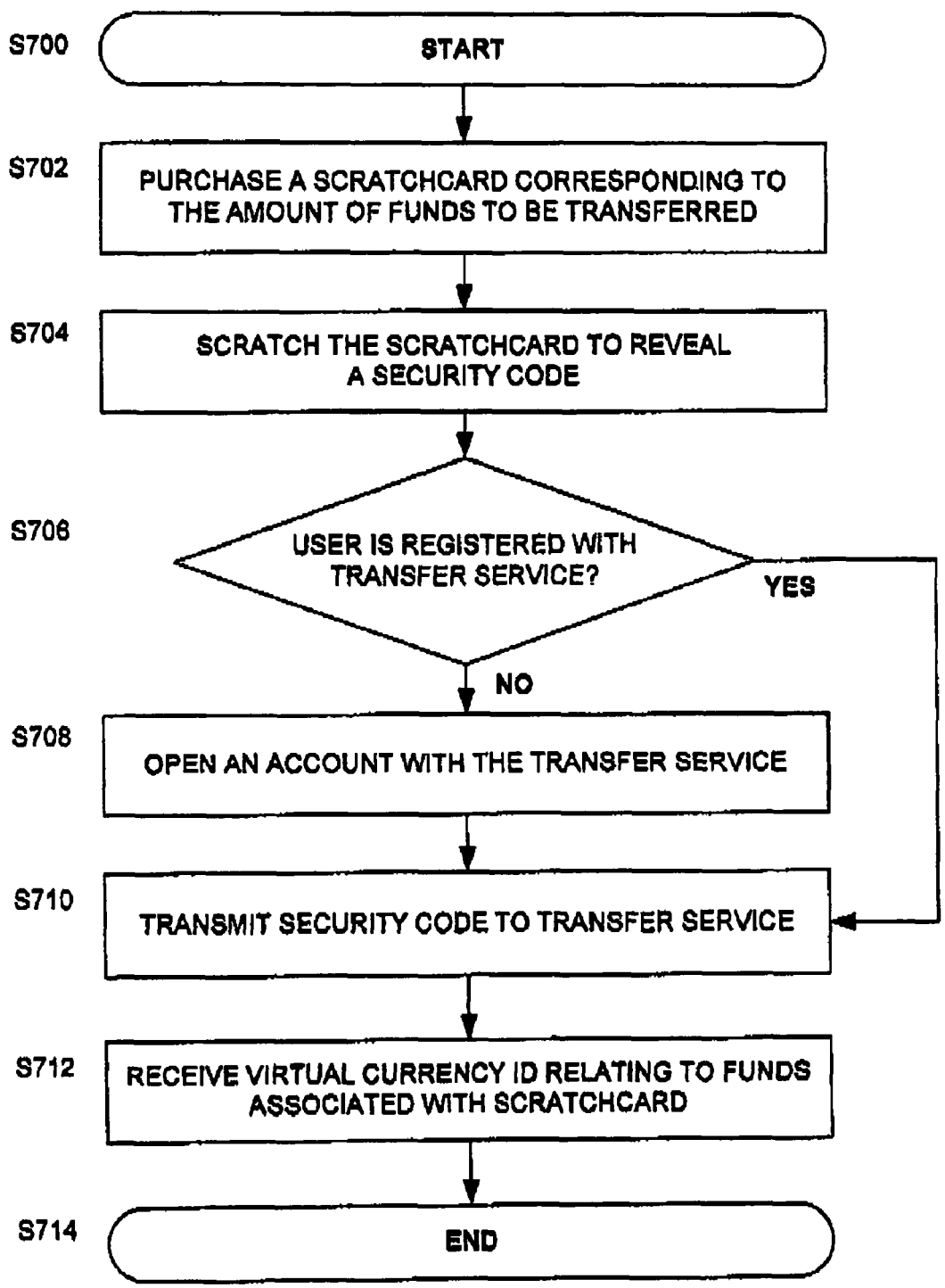
FIG. 7 is a flowchart illustrating an example of use of the system shown in FIG. 2.
Figure 8:
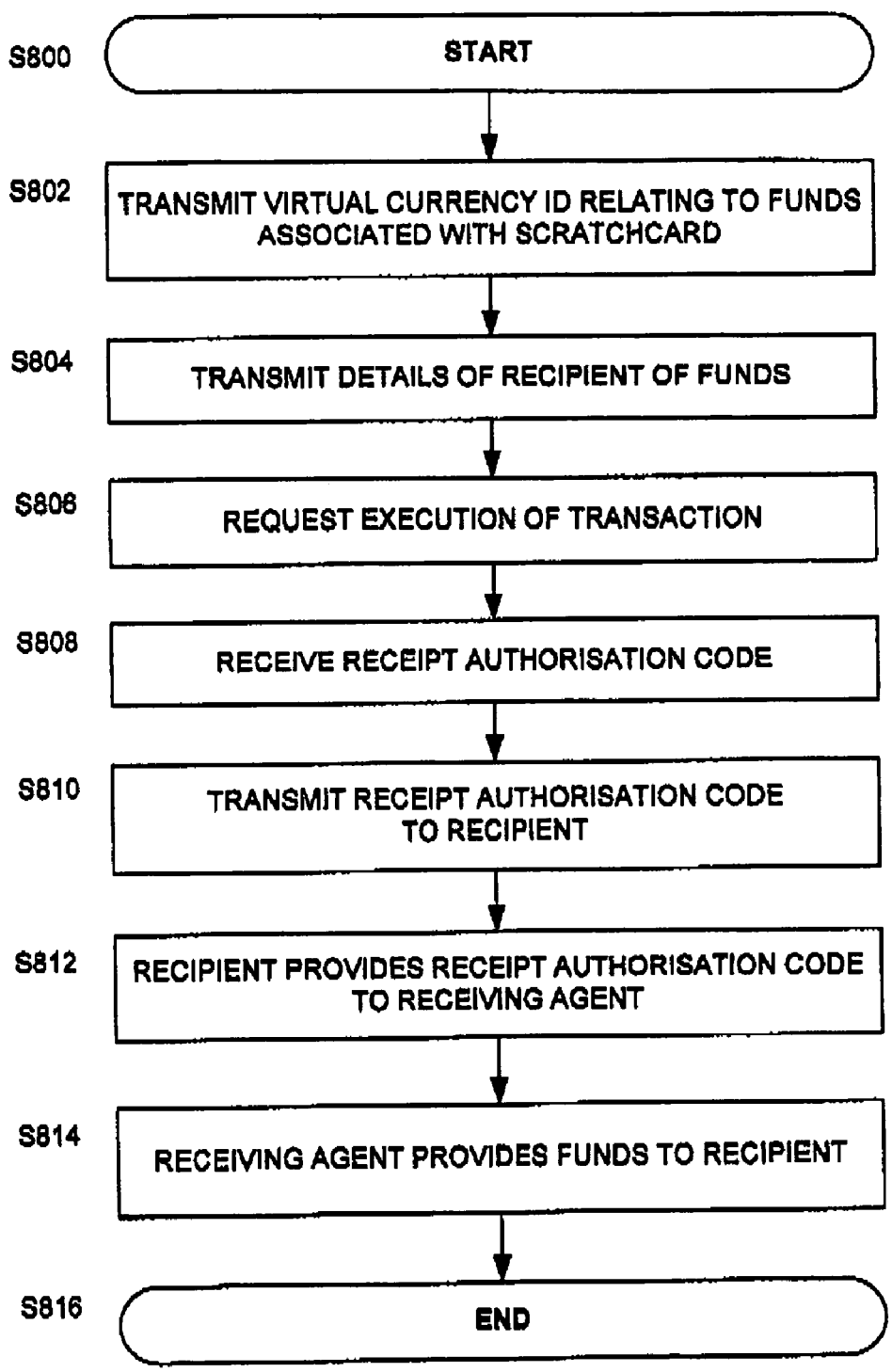
FIG. 8 is a flowchart illustrating a continuation of the example shown in FIG. 7.

The user can immediately execute a transaction using a security code (for example essentially by combining the processes described in FIGS. 7 and 8 and optionally omitting steps S712 and S802), for example if he wishes to make a specific transfer using the monetary value. Alternatively, the user can 'charge up' his account, and make money transfers or withdrawals at the time of his choosing. This provides considerable flexibility with respect to conventional money transfer systems.

The operation of the system will now be explained in further detail with reference to FIG. 9 to 11.

Figure 9:
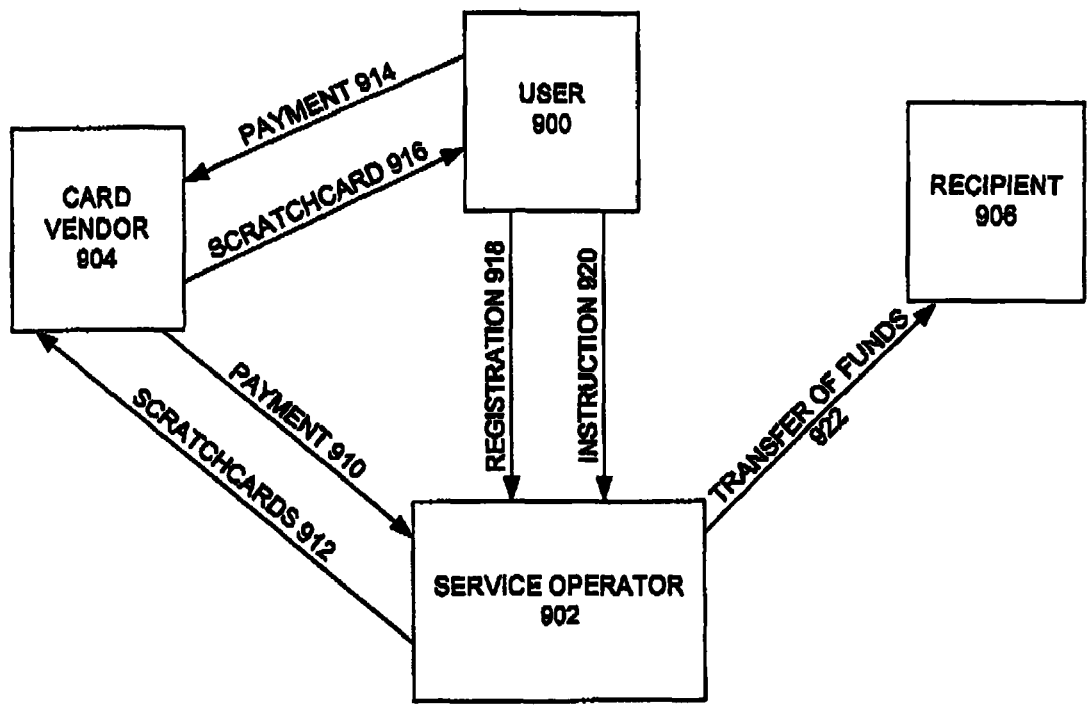
FIG. 9 is a schematic illustrating the use of the system of FIG. 2.

FIG. 9 is a schematic illustrating the use of the system described above. In FIG. 9 a user 900, a funds transfer service operator 902, a card vendor 904 and a recipient 906 are party to a number of transactions.

As shown, the card vendor 904 (which may be a shop or other commercial operation, such as an online retailer or gas/petrol station) purchases 912 a number of scratchcards as described above (each scratchcard containing a unique, hidden security code associated with an amount of money). In return the card vendor 904 makes an appropriate payment to the service operator 902. The amount paid by the card vendor 904 can be set by the service operator 902, and may be equal to the total sums of money associated with the scratchcards, or may be more (to generate a profit on all scratchcards sold) or may be less (in order to encourage sales of the scratchcards), for example.

The user 900 then makes a payment 914 to the vendor 904 in order to purchase 916 one or more scratchcards in respect of a desired sum of money to be transferred to the recipient 906. For example, a user 900 wishing to transfer $30 may purchase three $10 scratchcards, or may purchase sterling (£) scratchcards approximately equal or exceeding the value of $30 when converted into dollars ($). The scratchcards may be sold at a price greater than their nominal value (for example with a 1, 2, 5 or 10% premium) in order to return a profit for the card vendor 904. The involvement of the card vendor 904 then ends, without requiring any special processing to be carried out, or equipment to be used, by the vendor.

The user then registers the scratchcard 918 with the service operator 902, for example via a web portal, to have the value of the scratchcard allocated to himself. Later on (or, optionally, at the time of registration) the user then sends an instruction to the service operator 902 to transfer the funds allocated to him (or a portion thereof) to the recipient 906. The service operator 902 then carries out the requested transfer of funds 922.

As a consequence of this process, it is noted that the user need not have any interaction with the recipient, and the system provides the advantage that the recipient does not need to carry out any processing or verification, and the user does not have to be physically present at the recipient's location in order to effect the transfer. It is also noted that no bank accounts are required to be held by the user in order to hold and to transfer funds, although the service operator 902 or card vendor 904 may be a bank or similar institution, for example.

Figure 10:
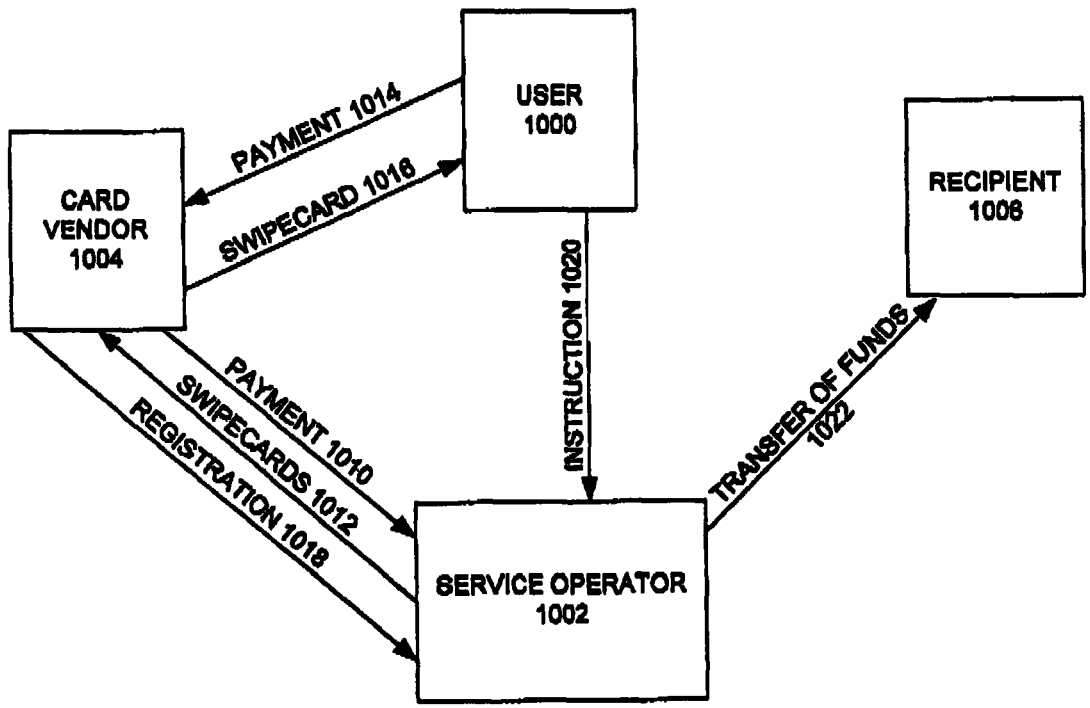
FIG. 10 is a schematic illustrating the use of the system of an alternative embodiment.

FIG. 10 illustrates the system of an alternative embodiment in which the security code (associated with an amount of funds) is encoded on a machine-readable magnetic swipe card, rather than being provided in a human-readable scratchcard.

FIG. 10 again concerns a user 1000, a service operator 1002, a card vendor 1004 and a recipient 1006. The card vendor 1004, as before, purchases 1012 a batch of swipecards in exchange for the relevant amount of payment 1010. The user 1000 then, as before, pays for 1014 and receives 1016 one or more swipecards. Encoded in the magnetic strip of the swipecard is the security code (or equivalent data from which the security code can be derived). Once purchased, the card vendor 1004 swipes the card using a card reader attached to a registration computer and takes the user's 1000 service operator 1002 account details and enters them also into the registration computer. The registration computer then connects to the service operator 1002 and registers 1018 the swipe card to the user 1000, causing the related funds to be allocated to the user at the point of sale of the card. This can reduce the risk of fraud.

The swipecard is then altered to record the fact that it has been registered, in effect providing an electronic receipt of the transaction between the user 1000 and the vendor 1004. The user account details may optionally also be encoded in the swipe card. Later on, the user 1000 can then instruct 1020 the service operator 1002, as before, to effect the transfer 1022 of funds to the recipient 1006. In a variant of this embodiment, the instruction may be given via the registration computer, either at the point of sale or later on.

Figure 11:
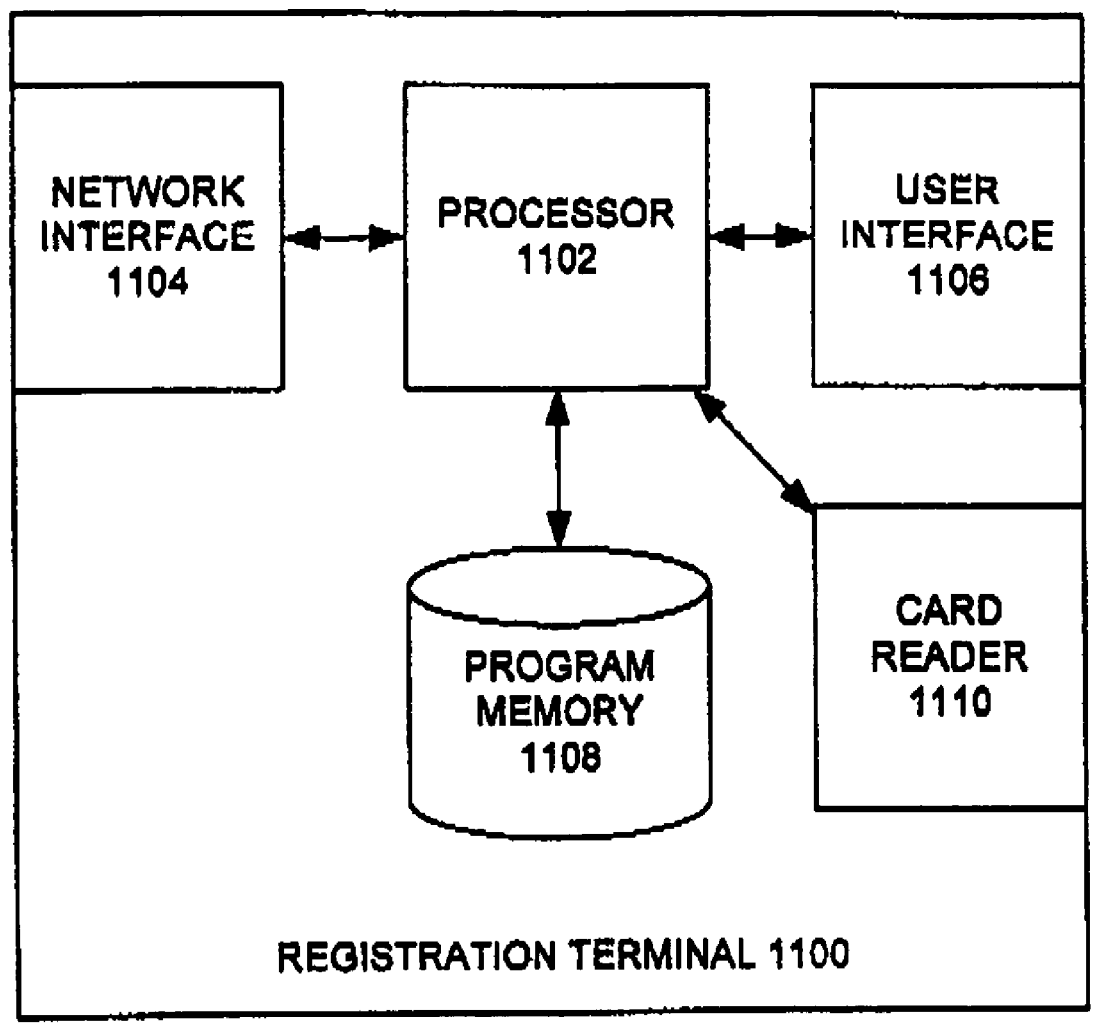
FIG. 11 is a schematic diagram of the components of a user terminal of the embodiment shown in FIG. 10.

FIG. 11 illustrates the components of the registration terminal mentioned above. The registration terminal 1100 comprises a processor 1102, network interface 1104, user interface 1106, program memory 908 and card reader 1110.

Appropriate software is provided in the program memory (hard disc, RAM, solid state memory or the like) 1108 and executed by the processor 1102 to allow the card vendor (or an agent thereof) and/or the user to operate the terminal 1100 via the user interface 1106 to carry out the transactions mentioned above. The terminal then communicates with the service operator system(s) via the network interface 1104, for example via an Internet connection.

In a variant of the alternative embodiment, other types of machine-readable cards or tokens are used, such as smartcards, cards with barcodes printed on them, solid state memory devices, or USB or other devices, with the card reader 1100 replaced or supplemented by appropriate reader devices. It will be appreciated that the registration terminal can also be used with the embodiment illustrated in FIG. 9 with appropriate adaptation if necessary (for example, the functions of the registration terminal may be combined with the functions of the user terminal 100 mentioned above).

The monetary values described above comprise predetermined amounts of 'virtual currency' whose value is established through the marketplace in relation to other currencies. That is, they might be measured in 'credit points' or the like, and the exchange rates could be set, for example, in accordance with supply and demand relating to the sale of the security codes (or associated delivery mechanisms). In variants of the main embodiment, the monetary values transferred constitute amounts representing money's worth of actual currencies (that is, amounts representing £100, $50, € 20, and so on).

When the monetary value comprises virtual currency, a conversion into the currency is made when the security code is registered, and a further conversion out of the currency is made when the virtual currency is redeemed for cash (or equivalent), regardless of the geographical boundaries which the monetary value has crossed. For example, a user might buy a £10 nominal value scratchcard in the UK and transfer the money to a recipient in the US, and the recipient in the US might retransmit the money to a recipient in France. In this case, if the recipient in France withdraw the cash equivalent of the transferred monetary value (£10), the amount withdrawn would effectively be converted from UK £ into Euros, via the virtual currency. In variants of the main embodiment where the monetary value represents money's worth of a 'real' currency, for example to comply with national regulations regarding currency transactions, a currency conversion of the monetary value is undertaken whenever the monetary value is transferred across national (currency) borders. In further variants, the monetary value represents money's worth of real currencies, but is only converted on entry to and on exit from the transaction processing system.

In variants of the main embodiment, the system allows the user to view any transactions and/or monetary value data associated with him, in response to him providing appropriate identifying and/or authentication data. The information may be provided by a web page or call centre interface, for example. To assist identification and/or authentication, the user may be provided with login details (including a password, for example).

The security code as described herein comprises a fixed length sequence of digits. In variants of the transaction processing system, alphanumeric or other symbols may instead be used, and variable length security codes may be provided. For ease of use the security code may, for example, include one or more code words (such as a sentence or other collection of words) which can provide a large range of permutations whilst being relatively easy to remember. The security codes may also be used in conjunction with (non-hidden) scratchcard identifiers (or equivalents), to increase the security of the system.

Additional security may be provided by preregistering scratchcards (or the equivalent) with the relevant retailers, either pre- or post-sale. The preregistration information can then be used as part of the validation/authentication process.

Whilst the security code management and/or generation functions have been described above as forming part of the transaction processing system, they may alternatively be provided by a different system, for example a security code registry which operates on a licensed and/or commissioned basis.

The monetary value transfers described above have involved the transfer or registration of the whole of the monetary value. Transfer or registration of only part of the monetary value is of course possible by appropriate modification of the above-mentioned systems and processes. For example, a user can instruct that a certain proportion of monetary value associated with a security code is transferred to a recipient, and that the remainder remain at his disposal. In this case, either the remainder or the transferred amount is assigned a new security code and/or monetary value identifier, and effectively becomes a new unit of monetary value data.

In a further variant of the main embodiment, the system can be used to pay invoices, utility bills and the like, and other features, including general features of commercial transactions, may also be incorporated with appropriate modification of the transaction processing systems presented herein. For example, a 'virtual bank account' can be provided, in which monetary value data is stored. Additionally or alternatively, an 'electronic wallet' may be provided, for storing one or more security codes, monetary value identifiers and/or transaction identifiers, whereby access to money or money's worth may be provided without requiring storage or management of the money itself.

In a yet further variant of the embodiment, the storage of any or all of the monetary value data, user account data, transaction data and security code data are provided in a portable storage device, such as a smart card which may be embedded in a credit card or other carrier. Interface devices may be provided as appropriate (in an ATM machine or otherwise, for example) to communicate with such a smart card, for example to allow a user to carry with him his own monetary value data, user account details, transaction details and/or security code data.

Further modifications lying within the spirit and scope of the present invention will be apparent to a skilled person in the art.

The invention claimed is:

1. A transaction processing server, comprising:
   a receiver to receive a request to initiate a transaction, the request including user identification data and monetary value authorisation data;
   a validator to validate the monetary value authorisation data;
   a processor to process the monetary value authorisation data to select monetary value data corresponding to the monetary value authorisation data;
   a store to store data representing an association between the user identification data and the monetary value data; and
   an output to output a monetary value identifier associated with the monetary value data.

2. A transaction processing server according to claim 1, further comprising:
   a unit to receive a request to execute the transaction, the request including the monetary value identifier; and
   a transaction processor to process the monetary value data to execute the transaction.

3. A transaction processing server according to claim 2, further comprising a transmitter to transmit data associated with the transaction to a recipient terminal.

4. A transaction processing server according to claim 2, wherein the request to execute the transaction further includes recipient identification data, and wherein the store is adapted to store further data representing an association between the recipient and the monetary value data.

5. A transaction processing server according to claim 1, wherein the processor is adapted to select monetary value data associated with a security code included in the monetary value authorisation data.

6. A transaction processing server according to claim 5, wherein the validator is adapted to determine whether or not the security code has previously been used.

7. A terminal for facilitating the processing of a transaction, comprising:
   a first receiver to receive a security code associated with a monetary value, to receive user identification data and to receive a monetary value identifier associated with monetary value authorisation data; and
   a transmitter to transmit a request to initiate a transaction, the request including user identification data and the monetary value authorisation data including the security code.

8. A terminal according to claim 7, wherein the terminal further comprises an execution transmitter to transmit a request to execute the transaction, the request including the monetary value identifier.

9. A terminal according to claim 8, further comprising a recipient identification data receiver, and wherein the execution transmitter is adapted to include the recipient identification data in the request.

10. A terminal according to claim 7, further comprising a reader to read the security code from a portable data storage device.

11. A terminal according to claim 8, further comprising a store to store the monetary value identifier on the portable data storage device.

12. A terminal according to claim 11, operable to transmit a request to execute the transaction, the request including the monetary value identifier read from the portable data storage device.

13. A system for processing transactions relating to monetary value data, comprising:
    a terminal for facilitating the processing of a transaction, comprising:
        means for receiving a security code associated with a monetary value;
        means for receiving user identification data; and
        means for transmitting a request to initiate a transaction, the request including user identification data and monetary value authorisation data including the security code; and
        means for receiving a monetary value identifier associated with the monetary value data; and
    a transaction processing server, comprising:
        means for receiving a request to initiate a transaction, the request including user identification data and monetary value authorisation data;
        validating means for validating the monetary value authorisation data;
        processing means for processing the monetary value authorisation data to select monetary value data corresponding to the monetary value authorisation data;
        storing means for storing data representing an association between the user identification data and the monetary value data; and
        output means for outputting a monetary value identifier associated with the monetary value data.

14. A system according to claim 13, further comprising a recipient terminal including means for receiving data associated with the transaction, and means for executing the transaction in accordance with the received data.

15. A method of facilitating the processing of a transaction, comprising:
    receiving a request to initiate a transaction, the request including user identification data and monetary value authorisation data;
    validating the monetary value authorisation data;
    processing the monetary value authorisation data to select monetary value data corresponding to the monetary value authorisation data;
    storing data representing an association between the user identification data and the monetary value data; and
    outputting a monetary value identifier associated with the monetary value data.

16. A method of facilitating the processing of a transaction, comprising:
    receiving a security code corresponding to a monetary value;
    receiving user identification data; and
    transmitting a request to initiate a transaction, the request including the user identification data and monetary value authorisation data including the security code; and
    receiving a monetary value identifier associated with the monetary value data.

17. A system for transferring funds, comprising:
    a receiver to receive a request from a sender to register a purchased security code corresponding to a monetary value;
    a validator to validate the security code;
    an allocator to allocate the monetary value to the sender;
    the receiver to receive a request from the sender to reallocate at least part of the monetary value to a recipient; and
    a reallocator to reallocate at least part of the monetary value in accordance with the received request to reallocate.

18. A system according to claim 17, wherein the reallocator comprises:
    the receiver to receive the transaction identifier from the recipient;
    a validator to validate the transaction identifier; and
    an executor to carry out the step of reallocating at least part of the monetary value.

19. A system for transferring funds from a sender to a recipient, comprising:
    means for allocating to the sender an amount of virtual currency representing money's worth, wherein the virtual currency is not an official currency of any jurisdiction;
    means for receiving a request from the sender to reallocate at least part of the virtual currency to a recipient; and
    means for reallocating at least part of the virtual currency in accordance with the received request to reallocate.

20. A system for processing funds, comprising:
    means for converting an amount of real currency into an amount of virtual currency in accordance with an exchange rate relating the real currency to the virtual currency, wherein the virtual currency is not an official currency of any jurisdiction;
    means for carrying out a transaction in respect of the virtual currency; and
    means for converting the virtual currency back into real currency in accordance with an exchange rate relating the virtual currency to the real currency.

21. A computer system for facilitating the transfer of monetary value, comprising:
    a data memory operable to store monetary value data;
    an instruction memory storing processor implementable instructions; and
    a processor operable to read and process the data in accordance with instructions stored in the instruction memory;
    wherein the instructions stored in the instruction memory comprise instructions for controlling the processor to perform a method comprising:
        receiving a request to initiate a transaction, the request including user identification data and monetary value authorisation data;
        validating the monetary value authorisation data;
        processing the monetary value authorisation data to select monetary value data corresponding to the monetary value authorisation data;
        storing data representing an association between the user identification data and the monetary value data; and
        outputting a monetary value identifier associated with the monetary value data.

22. A computer system according to claim 21, wherein the method further comprises:
    receiving a request to execute the transaction, the request including the monetary value identifier; and
    processing the monetary value data to execute the transaction.

23. A computer system according to claim 22, wherein the method further comprises transmitting data associated with the transaction to a recipient terminal.

24. A computer system according to claim 22, wherein the request to execute the transaction further includes recipient identification data, and wherein the step of storing further includes storing further data representing an association between the recipient and the monetary value data.

25. A computer system according to claim 21, wherein the step of processing further comprises selecting monetary value data associated with a security code included in the monetary value authorisation data.

26. A computer system according to claim 25, wherein the step of validating further comprises determining whether or not the security code has previously been used.

27. A computer system for facilitating the transfer of monetary value, comprising:
   a data memory operable to store monetary value data;
   an instruction memory storing processor implementable instructions; and
   a processor operable to read and process the data in accordance with instructions stored in the instruction memory;
   wherein the instructions stored in the instruction memory comprise instructions for controlling the processor to perform a method comprising:
      receiving a security code corresponding to a monetary value;
      receiving user identification data; and
      transmitting a request to initiate a transaction, the request including the user identification data and monetary value authorisation data including the security code; and
      receiving a monetary value identifier associated with the monetary value data.

28. A computer system according to claim 27, wherein the method further comprises transmitting a request to execute the transaction, the request including the monetary value identifier.

29. A computer system according to claim 28, wherein the method further comprises receiving recipient identification data, and wherein the step of transmitting a request to execute the transaction further comprises including the recipient identification data in the request.

30. A computer system according to claim 27, further comprising means for reading the security code from a portable data storage device.

31. A computer system according to claim 30, further comprising means for storing the monetary value identifier on the portable data storage device.

32. A computer system according to claim 31, operable to transmit a request to execute the transaction, the request including the monetary value identifier read from the portable data storage device.

* * * * *